Jan. 27, 1970 K. K. GRIFFITHS ET AL 3,491,446
EXTENSION DEVICE
Filed Aug. 9, 1967 2 Sheets-Sheet 1

INVENTOR.
Keith K. Griffiths
James D. Martin
BY Eckhoff & Slick
Attorneys

EXTENSION DEVICE

Filed Aug. 9, 1967

INVENTOR.
Keith K. Griffiths
James D. Martin
BY Eckhoff & Slick
Attorneys 3,491,446
EXTENSION DEVICE
Keith K. Griffiths, 4037 Susanwood Drive, Concord, Calif. 94521, and James D. Martin, 18 Gary Way, Alamo, Calif. 94507
Filed Aug. 9, 1967, Ser. No. 659,454
Int. Cl. A61c 1/08
U.S. Cl. 32—23 3 Claims

ABSTRACT OF THE DISCLOSURE

An extension device is provided for current commercial ultrasonic dental tooth cleaning structures. Controls from the commercial ultrasonic unit lead to a junction box and in turn branch from the junction box to a plurality of remote control units into which the ultrasonic tooth cleaning handpiece can be inserted. Controls for the handpiece are provided on each remote unit.

BACKGROUND OF THE INVENTION

Field of the invention

An extension device is provided for an ultrasonic dental tooth cleaning unit so that the tooth cleaning handpiece which is inserted in the main unit can now be inserted in any one of a plurality of remote units thereby allowing the cleaning operation to be carried on at a number of locations remote from the main unit.

Description of the prior art

No patent search was made on this device prior to the filing of the application.

SUMMARY OF THE INVENTION

A recently accepted and progressive method of cleaning teeth involves the use of an ultrasonic dental unit which in basic terms cleans teeth by means of an ultrasonic tuning fork which is contained in a handpiece which in turn is inserted into the ultrasonic unit itself. The ultrasonic dental unit imparts high frequency energy to the tuning fork, the result being that the metal tip of the tuning fork moves back and forth within a minute distance of approximately $\frac{1}{1000}$ of an inch at an extremely high speed of about 20,000 to 25,000 strokes per second. This activated tip when properly manipulated comes in close contact with the teeth of the patient and painlessly and quickly removes tartar, food, and other foreign materials from the teeth.

At the present time these ultrasonic dental units with the handpiece containing the tuning fork have a range of about six to eight feet as that is the length of the cord that is put on the units by the various manufacturers. This means that if a dentist wants to use an advanced technique such as has been described above, a separate ultrasonic unit must be purchased for each of the operatories. This is fine for the equipment manufacturers but is very expensive for the individual dentist, especially when one dentist is able to utilize effectively three of four operatories at the same time.

A solution to the above problem has been arrived at by providing an extension device so that one of the commercially purchased ultrasonic dental units may be used in conjunction with the extension device of this application to provide use of the ultrasonic handpiece to a plurality of operatories.

It is the principal object of the present invention to provide a new and improved extension device for an ultrasonic dental unit.

Another object of the invention is to provide an extension device which can be easily connected to the ultrasonic dental unit without requiring any internal changes within the ultrasonic dental unit.

A further object is to provide an extension device into which an ultrasonic handpiece can be connected to operate at a distance remote from the main ultrasonic dental unit.

A still further object is to provide an extension device which has all the controls necessary for the operation of the ultrasonic handpiece.

DESCRIPTION OF A PREFERRED EMBODIMENT

Figure 1:
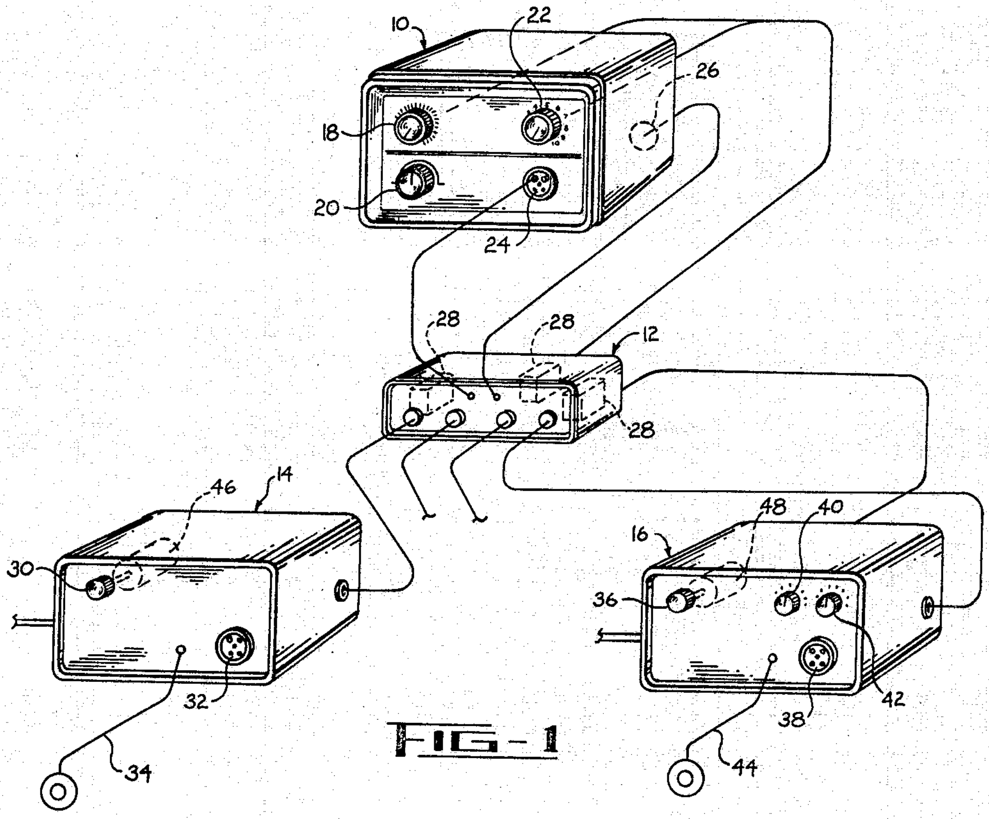
FIGURE 1 is an isometric or perspective view illustrating the extension device of the present invention connected to a main ultrasonic dental unit.

Referring particularly to FIGURE 1, there is shown the extension device of the present invention which is adapted for use with an ultrasonic tooth cleaning handpiece device. The invention of this application has interconnected the following pieces of equipment, namely, a commercial ultrasonic tooth cleaning unit, herein termed a "main unit," generally indicated 10, a junction box, generally indicated 12, a first remote control unit, generally indicated 14, and a second remote control unit, generally indicated 16.

The commercial unit 10 comes equipped with an intensity regulator 18, a water control 20, a tuning intensity control 22, a handpiece socket 24, and a foot pedal socket 26.

The main function of the junction box 12 which has a plurality of relay boxes 28 therein is to take the various connections from the commercial unit 10 and turn them into a plurality of leads going out of the junction box 12 to the various remote units such as are generally indicated 14 and 16.

As illustrated, the first remote unit 14 has a water control 30, a handpiece socket 32, and a foot pedal 34. The second remote unit 16 has a water control 36, a handpiece socket 38, a tuning control 40, an intensity control 42, and a foot pedal 44, similar to foot pedal 34. The water valves 30 and 36 are connected respectively to solenoid valves 46 and 48. It can thus be seen that first remote unit 14 is the basic unit while second remote unit 16 has a tuning control and intensity control in addition to the water control. handpiece socket and foot pedal of the basic unit. Both the tuning control and intensity control are optional equipment.

Figure 2:
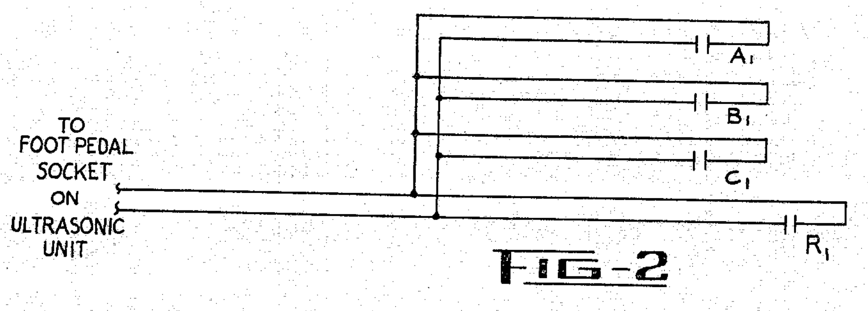
FIGURE 2 is a diagrammatic view of an electrical system for the extension device illustrating the arrangement for the foot pedal sockets.

A schematic diagram of the relay contacts which operate the foot pedal control 26 on the main ultrasonic unit 10 is shown in FIGURE 2. When a remote unit's relay is operated, the particular relay's contacts will close. The electrical signal coming from one pin of the foot pedal socket will then pass through the now closed contact at either $A_1$, $B_1$, $C_1$ or $R_1$ and return to the other pin of the foot pedal socket. This places the main unit into operation as would occur if a foot pedal were connected directly to the foot pedal socket 26 of the main unit.

Figure 3:
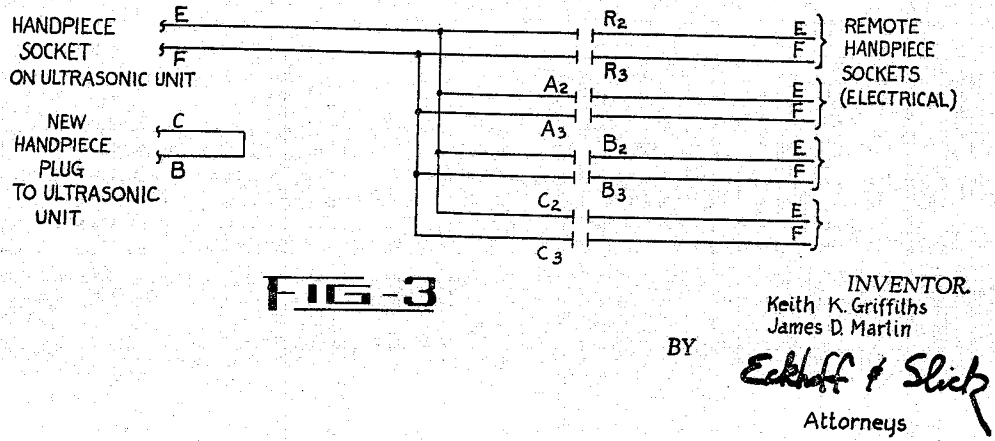
FIGURE 3 is a diagrammatic view of an electrical system for the extension device illustrating the arrangement for the handpiece sockets.

As shown in FIGURE 3, the electrical signal generated by the main ultrasonic unit which operates the handpiece comes from the handpiece socket on two wires. This signal goes to two contacts on each remote relay ($A_2$ and $A_3$, $B_2$ and $B_3$, $C_2$ and $C_3$, and $R_2$ and $R_3$). When a relay closes, this signal goes through the now closed contacts and to the particular handpiece being used through the two connectors E and F on the handpiece socket itself.

Figure 4:
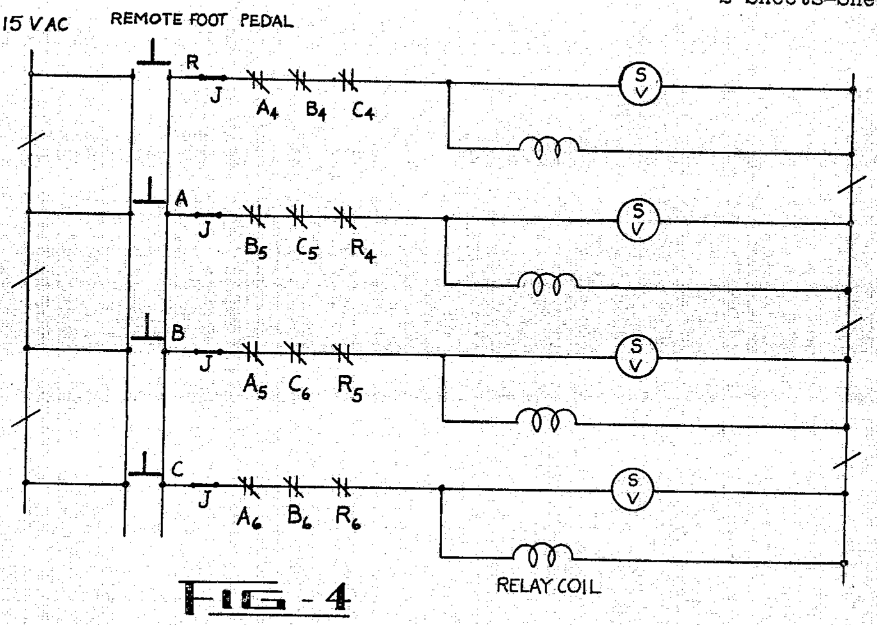
FIGURE 4 is a diagrammatic view of an electrical system for the extension device illustrating the arrangement of the solenoid valves and the remote relay coils.

FIGURE 4 shows the electrical circuits that operate when a foot pedal is depressed at any of the remote locations. When foot pedal such as 34 or 44 is operated, the foot pedal switch closes and the relay coils operate closing or opening various relay contacts. At the same time, the water solenoid valve SV coil operates opening the water valve to provide water to the handpiece.

Since all of the normally closed relay contacts such as $R_4$, $R_5$, $R_6$ or $A_4$, $A_5$, $A_6$ or $B_4$, $B_5$, $B_6$ or $C_4$, $C_5$, $C_6$ open when a foot pedal is operated, the other remote handpieces become locked out and therefore cannot be operated while one unit is operating. This will hold true for any of the remote units. The one operating will lock out all others while it is in operation.

The handpiece plug has a jumper wire J to interconnect the main ultrasonic or the remote unit's circuit to allow it to operate only when either a handpiece or the handpiece plug is in place. The jumper wire J will prevent a remote unit from operating if a handpiece is not connected to the unit.

Figure 5:
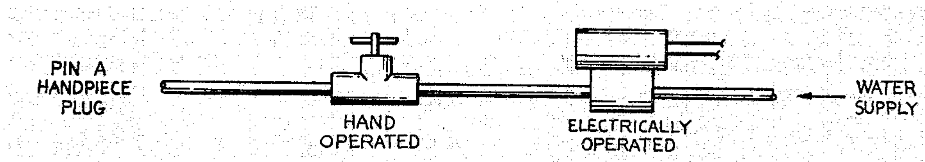
FIGURE 5 is a diagrammatic view of a water system for the extension device.

FIGURE 5 shows the water system, typical for all remote units. The electrically operated solenoid valve SV opens allowing water to go to the handpiece through the hand operated valve. The hand valve controls the volume of water to the handpiece. The solenoid valve controls when it will flow.

Figure 6:
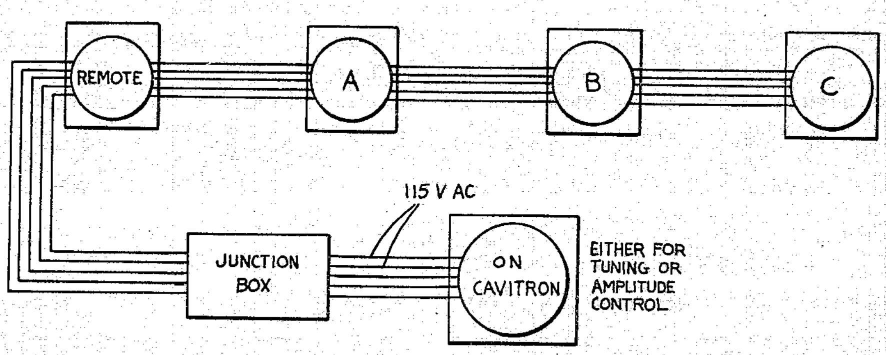
FIGURE 6 is a diagrammatic view of an electrical system for the extension device illustrating the arrangement for the remote tuning and/or the remote ultrasonic intensity controls.

FIGURE 6 illustrates that by the use of selsyn motors or by the use of a transducer-servo system, remote tuning and/or remote amplifier adjustments can be made.

In the selsyn motor hookup the shaft of the remote selsyn motor is driven by the operator's hand to adjust either the tuning or the amplitude. The motors are connected electrically as is common in selsyn motor systems and the motor on the main unit drives the tuning or amplitude shaft as desired. When one shaft is rotated by the operator, all motors respond both on the main unit and on the remote units to provide angular adjustment of the tuning or amplitude controls.

In the transducer-servo system each remote unit has a transducer and the servo motor is driving the shaft desired on the main unit. In this case each transducer may be set for a different position. When a remote is used, the servo motor will position its shaft to the setting of the remote transducer without changing the setting of any of the other transducers.

The foregoing detailed description has been given for clearness of understanding only, and no unnecessary limitations should be understood therefrom, for some modifications will be obvious to those skilled in the art.

We claim:

1. An extension device for an ultrasonic dental tooth cleaning structure having suitable controls contained therein and which utilizes an ultrasonic handpiece comprising:

(a) a junction box having therein first connections from the suitable controls on the cleaning structure, (b) a plurality of remote control units having second connections leading to said junction box intersecting with said first connections, (c) whereby said ultrasonic handpieces can be controlled from any one of said plurality of remote control units and the operation of one remote control unit prevents all other units from operating while said remote control unit is in operation.

2. The extension device of claim 1 wherein controls for water and intensity are contained in all units.

3. The extension device of claim 1 wherein a remote control unit can operate only when connected to an ultrasonic handpiece.

References Cited

UNITED STATES PATENTS

| | | | |
|---|---|---|---|
| 3,213,537 | 10/1965 | Balamuth et al. | 32—28 |
| 3,359,426 | 12/1967 | Burr | 307—28 |

ROBERT PESHOCK, Primary Examiner